United States Patent
Inui et al.

(10) Patent No.: US 6,925,233 B2
(45) Date of Patent: *Aug. 2, 2005

(54) OPTICAL WAVEGUIDE DEVICE MANUFACTURING JIG, METHOD OF MANUFACTURING OPTICAL WAVEGUIDE DEVICE BY USE OF THE SAME JIG, AND THE SAME OPTICAL WAVEGUIDE DEVICE

(75) Inventors: Yukitoshi Inui, Nishikasugai-gun (JP); Kuniyoshi Kondo, Nishikasugai-gun (JP); Manabu Kagami, Aichi-gun (JP); Tatsuya Yamashita, Aichi-gun (JP); Akari Kawasaki, Aichi-gun (JP); Hiroshi Ito, Aichi-gun (JP)

(73) Assignee: Toyoda Gosei Co., Ltd., Nishikasugai-gun (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/920,233

(22) Filed: Aug. 18, 2004

(65) Prior Publication Data

US 2005/0013578 A1 Jan. 20, 2005

Related U.S. Application Data

(63) Continuation of application No. 10/216,224, filed on Aug. 12, 2002, now Pat. No. 6,823,116.

(30) Foreign Application Priority Data

Aug. 13, 2001 (JP) .................................. P2001-245705

(51) Int. Cl.$^7$ ................................................ G02B 6/26
(52) U.S. Cl. ........................................ 385/39; 385/147
(58) Field of Search ............................ 385/39, 62, 63, 385/81, 84, 87–94, 102, 136, 147

(56) References Cited

U.S. PATENT DOCUMENTS

| 6,081,632 A | 6/2000 | Yoshimura et al. ............. 385/5 |
| 6,823,116 B2 * | 11/2004 | Inui et al. ...................... 385/39 |
| 2002/0114601 A1 | 8/2002 | Kagami et al. ............. 430/321 |
| 2002/0186935 A1 * | 12/2002 | Inui et al. ...................... 385/84 |

FOREIGN PATENT DOCUMENTS

| EP | 0 856 389 A2 | 8/1998 |
| EP | 1 284 426 A2 | 2/2003 |
| JP | 8-320422 | 12/1996 |
| JP | 2000-347043 | 12/2000 |
| WO | WO 92/00185 | 1/1992 |
| WO | WO 96/42036 | 12/1996 |

OTHER PUBLICATIONS

European Search Report dated May 7, 2004.

* cited by examiner

*Primary Examiner*—Phan T. H. Palmer
(74) *Attorney, Agent, or Firm*—McGinn & Gibb, PLLC

(57) ABSTRACT

Interference filters which are optical components are erected in advance on optical paths in a transparent container, and the transparent container is filled with a photo-curable resin solution. Further, a jig is prepared for manufacturing an optical waveguide device. The jig includes a housing, and holes. On this occasion, positions of the holes are set such that light input through the hole reaches the holes via the interference filters. Optical fibers are fitted into the holes of the housing and the housing is mounted on the transparent container. Next, light at a predetermined wavelength is guided into the optical fibers so that optical waveguides are formed in the photo-curable resin solution. Next, the photo-curable resin solution is exchanged for a low-refractive-index photo-curable resin solution and then the low-refractive-index photo-curable resin solution is solidified wholly by ultraviolet light. Finally, for example, an optical fiber, a light-receiving element, etc. are provided.

25 Claims, 9 Drawing Sheets

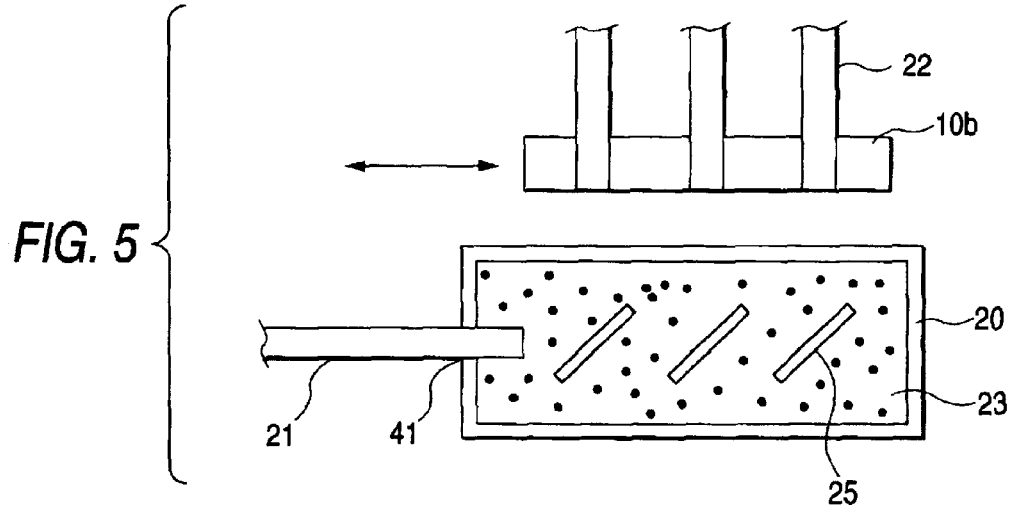

OPTICAL WAVEGUIDE DEVICE MANUFACTURING JIG, METHOD OF MANUFACTURING OPTICAL WAVEGUIDE DEVICE BY USE OF THE SAME JIG, AND THE SAME OPTICAL WAVEGUIDE DEVICE

The present Application is a Continuation Application of U.S. patent application Ser. No. 10/216,224 filed on Aug. 12, 2002, now U.S. Pat. No. 6,823,116.

The present application is based on Japanese Patent Application No. 2001-245705, which is incorporated herein by reference.

BACKGROUND OF THE INVENTION

1. Field of the Invention

The present invention relates to an optical waveguide device manufacturing jig for manufacturing an optical waveguide device with high accuracy, a method of manufacturing the optical waveguide device by use of the jig, and the optical waveguide device. Particularly, it relates to a jig for manufacturing an optical waveguide device easily and accurately by guiding light at a predetermined wavelength into a container from predetermined positions preset in the jig in the condition that the container contains optical components inserted therein and is filled with a photo-curable resin solution; a method of manufacturing the optical waveguide device by use of the jig; and the optical waveguide device. The invention can be applied to manufacturing of an inexpensive low-loss apparatus such as an optical transmitter/receiver, an optical interconnection, an optical demultiplexer or an optical mutliplexer in the field of optical fiber communication.

2. Related Art

In recent years, attention has been paid to a technique in which beam-like light at a predetermined wavelength is guided into a photo-curable resin solution to thereby form an optical waveguide device on the basis of a self-focusing phenomenon. The self-focusing phenomenon is a phenomenon in which diverging irradiation light is confined in a solid phase region due to increase in refractive index in the solid phase when the liquid phase of the photo-curable resin is changed to the solid phase by light irradiation. The optical waveguide formed by use of this phenomenon is called a self-forming optical waveguide. Hereinafter, the self-forming optical waveguide is simply referred to as an optical waveguide. As a specific example, Japanese Patent Publication No. H08-320422 has disclosed a method of producing an optical waveguide system and an optical device using the optical waveguide system. This method is a method in which light having at least one predetermined wavelength is guided into a photo-curable resin solution through at least one place in the condition that optical components such as a light-receiving element, a lens, a prism, and a mirror are disposed in the photo-curable resin solution so that the optical components are coupled with one another by optical waveguides formed by use of the self-focusing phenomenon. In such a manner, there is formed an optical device containing various optical components connected to one another by optical waveguides. When, for example, various interference filters are erected along the optical axis, an optical waveguide type demultiplexing filter is formed. When, for example, a half mirror is disposed in the photo-curable resin solution and input and output ports of the optical device are coupled with each other by optical waveguides, an optical waveguide type branching unit or an optical waveguide type multiplexer is formed.

Particularly, in this example, the manufacturing method is configured so that light is guided into the photo-curable resin solution from two-way directions so that optical waveguides are coupled with each other by a so-called self-alignment effect in which the optical waveguides from two sides of the optical device are led into each other and coupled with each other at a midpoint to thereby reduce loss at the coupling portion.

In the related-art example, however, one kind of photo-curable resin solution is used. If the one kind of photo-curable resin solution is cured, it is difficult to form clads of optical waveguides. That is, there is a problem that transmission loss occurs because of slight damage or dust on surfaces of the optical waveguides. Moreover, in the related-art example, because the optical waveguides are only supported by the input and output ports or the optical components, there is another problem that an optical waveguide device strong against mechanical vibration cannot be produced.

In the related-art example, for example, a semiconductor laser as an optical component may be incorporated. That is, the wavelength used for forming the optical waveguides is made equal to the wavelength for actual applications (for example, in optical communication). In this case, there is a problem that the optical waveguides obtained on the basis of the relation between the predetermined wavelength and the absorption rate make transmission loss large.

Moreover, the feature of the related-art example is in that light is guided into the photo-curable resin solution from different directions to form optical waveguides from the different directions so that the optical waveguides are aligned at a midpoint by the self-alignment effect. Accordingly, the feature of the related-art example is to produce a low-loss optical waveguide device. It is, however, necessary to align the optical waveguides with accuracy, for example, of tens of micrometers at the midpoint in order to perform the self-alignment effect in the condition that the diameter of each of the optical waveguides is one hundred and several tens of microns. When optical components are disposed in the photo-curable resin solution, the positional or angular displacement of the optical components is a large factor which causes lowering of the self-alignment effect. In the related-art example, the optical waveguide devices are not always efficiently produced.

SUMMARY OF THE INVENTION

The invention is designed to solve the problems and an object of the invention is to produce a high-precision optical waveguide device easily by forming a predetermined number (N) of light inlets corresponding to optical components at predetermined positions in a housing of an optical waveguide device manufacturing jig, and by guiding light at a predetermined wavelength into a container through the predetermined number (N) of light inlets which are positioned in the housing.

Another object of the invention is to provide a jig for manufacturing an optical waveguide device efficiently by a simple operation of forming holes in the predetermined number (N) of light inlets, fitting optical fibers in the holes, and outputting light at a predetermined wavelength from the optical fibers; and to provide a method of manufacturing the jig.

A further object of the invention is to provide a method of manufacturing an optical waveguide device with low transmission loss in which optical waveguides are embedded in a low-refractive-index resin solution to thereby form step-index optical waveguides. A still further object of the invention is to provide a jig which can adjust optical components to thereby improve operating efficiency, and to provide a method of manufacturing an optical waveguide device with high accuracy. Another object of the invention is to provide an optical waveguide device manufactured by such a method.

The foregoing objects are objects to be achieved individually by aspects of the invention and it is not to be understood that all the objects can be achieved by each of the aspects of the invention.

(1) To achieve these objects, in accordance with the invention, there is provided a jig for manufacturing an optical waveguide device provided with at least one optical component and a predetermined number (N) of input-output ends, the jig being employed by mounted on a transparent container in which a photo-curable resin solution and the optical component is contained, characterized by:

a housing; and the predetermined number (N) of light inlets provided in the housing at predetermined positions corresponding to the input-output ends;

wherein a first light at a predetermined wavelength is guided into the transparent container through at least one of the light inlets to cure the photo-curable resin solution to thereby form optical waveguides in a direction of a first optical axis and a direction of a second optical axis changed by the optical component in the photo-curable resin solution so that the optical component is connected to the light inlets with the optical waveguides, whereby the optical waveguide device having the predetermined number (N) of input-output ends is manufactured.

(2) According to the invention, there is provided a jig for manufacturing an optical waveguide device according to (1), characterized in that the at least one light inlet is provided with a hole into which an optical fiber is fitted.

(3) According to the invention, there is provided a jig for manufacturing an optical waveguide device according to (1) or (2), further characterized by an optical condensing system attached to at least one of the light inlets through which the first light at the predetermined wave length is guided into the transparent container.

(4) According to the invention, there is provided a jig for manufacturing an optical waveguide device according to any one of (1) through (3), further characterized by an adjusting device for adjusting at least one of a position and an angle of the optical component relative to the first and second optical axis of the first light guided into the transparent container.

(5) According to the invention, there is provided a jig for manufacturing an optical waveguide device according to any one of (1) through (4), characterized in that the housing containing the predetermined number (N) of light inlets is separable into a plurality of parts.

(6) According to the invention, there is provided a method of manufacturing an optical waveguide device comprising the steps of:

inserting at least one optical component in a transparent container at a predetermined position;

filling the transparent container with a photo-curable resin solution;

mounting the jig defined in any one of (1) to (5) onto the transparent container;

guiding a first light at a predetermined wavelength into the transparent container through at least one of the light inlets curing the photo-curable resin solution thereby forming optical waveguides so that the optical component is connected to the light inlets with the optical waveguides; and forming an optical waveguide device having the predetermined number (N) of input-output ends.

(7) According to the invention, there is provided a method of manufacturing an optical waveguide device according to (6), characterized in that the at least one light inlet is provided with a hole into which an optical fiber with which the first light at the predetermined wavelength is output is fitted.

(8) According to the invention, there is provided a method of manufacturing an optical waveguide device according to (6) or (7), characterized in that at least opposite two ends of each of the optical waveguides are fixed to the transparent container.

(9) According to the invention, there is provided a method of manufacturing an optical waveguide device according to any one of (6) through (8), characterized in that:

at least one of a position and an angle of the optical component is adjustable from an outside of the transparent container; and the adjustment of the optical component is carried out after the photo-curable resin solution is injected into the transparent container so that a second light input through one of the light inlets is output through another of the light inlets while the second light has a wavelength incapable of curing the photo-curable resin solution.

(10) According to the invention, there is provided a method of manufacturing an optical waveguide device according to any one of (6) through (9), further characterized by the steps of:

removing an uncured part of the photo-curable resin solution in surroundings of the optical waveguides from the transparent container after the optical waveguides are formed; and embedding the optical waveguides in a low-refractive-index resin solution having a refractive index lower than that of each of the optical waveguides and solidifying the low-refractive-index resin solution.

(11) According to the invention, there is provided a method of manufacturing an optical waveguide device according to (10), characterized in that the low-refractive-index resin solution is another photo-curable resin solution or a heat-curable resin solution which is highly mutually soluble in the photo-curable resin solution with which the optical waveguides are formed.

(12) According to the invention, there is provided a method of manufacturing an optical waveguide device according to any one of (6) through (9), characterized in that:

the photo-curable resin solution is a mixture solution of a high-refractive-index photo-curable resin solution and a low-refractive-index photo-curable resin solution different in curing initiating wavelength; and a light at a first predetermined wavelength capable of curing only the high-refractive-index photo-curable resin solution is guided into the transparent container through at least one of the light inlets to form the optical waveguides, and after a formation of the optical waveguides, a light at a second predetermined wavelength capable of curing both the high-refractive-index photo-curable resin solution and the low-refractive-index photo-curable resin solution is radiated onto a whole uncured part of the mixture solution in surroundings of the optical waveguides to thereby solidify the mixture solution.

(13) According to the invention, there is provided a method of manufacturing an optical waveguide device according to any one of (6) through (12), characterized in that the predetermined wavelength used for a formation of the optical waveguides is different from wavelengths of optical signals with which the optical guide device is operated after the optical waveguide device is formed.

(14) According to the invention, there is provided an optical waveguide device manufactured by use of an optical waveguide device manufacturing jig defined in anyone of (1) through (5) and an optical waveguide device manufacturing method defined in any one of (6) through (13), wherein at least one component of any optical elements and photoelectric conversion elements is coupled with the input-output ends of the optical waveguide device.

The optical waveguide device manufacturing jig as in (1) is a jig which has a housing, and the predetermined number (N) of light inlets provided in the housing at predetermined positions. The "predetermined positions" mean positions which accurately correspond to the position of at least one optical component. To manufacture an optical waveguide device, first, a transparent container containing at least one optical component inserted therein is filled with a photo-curable resin solution. Then, this jig is mounted on the transparent container and light at a predetermined wavelength is guided into the transparent container through arbitrary light inlets of the predetermined number (N) of light inlets located in the housing of the jig at predetermined positions. The "arbitrary light inlets" may be light inlets smaller in number than N or may be all of the light inlets. Guiding light at a predetermined wavelength through all the light inlets means that the photo-curable resin solution is cured from two-way directions.

That is, the photo-curable resin solution is cured from a one-way direction or two-way directions to thereby form optical waveguides in a direction of an optical axis and in a direction of the optical axis changed by at least one optical component disposed in the photo-curable resin solution. Particularly when light at a predetermined wavelength is guided into the transparent container from two-way directions, optical waveguides are coupled with each other at a predetermined midpoint. In this manner, there can be obtained an optical waveguide device in which at least one optical component is connected to the predetermined number (N) of light inlets by the optical waveguides.

When an optical waveguide device is manufactured thus by use of the jig in which the positional relation between at least one optical component and the light inlets is set in advance, an operating person need not align the optical component with the light inlets. That is, the optical waveguide device can be manufactured efficiently. Moreover, because the optical waveguide device is manufactured by use of the jig in which the positional relation of the light inlets is sustained, there is little variation in quality of the optical waveguide device manufactured. That is, the optical waveguide device having stable quality can be manufactured.

The optical waveguide device manufacturing jig as in (2) is an optical waveguide device manufacturing jig as defined in (1), wherein each of the arbitrary light inlets is provided with a hole formed therein so that an optical fiber is fitted into the hole. That is, because light at a predetermined wavelength is guided through the optical fiber fitted into the hole formed in each of the arbitrary light inlets, optical waveguides can be formed easily and accurately. Moreover, because the optical fiber is excellent in flexibility, workability in a process for manufacturing of the optical waveguide device can be improved.

The optical waveguide device manufacturing jig as in (3) is a jig for manufacturing an optical waveguide device as defined in (1) or (2), wherein a light-coupling optical system is attached to each of the arbitrary light inlets through which the light at the predetermined wavelength is guided into the transparent container.

The optical condensing system may be provided on the transparent container side or may be provided on the light source side. When light at a predetermined wavelength is guided into the transparent container through the arbitrary light inlets of the housing, light transmitted through the transparent container is focused on the vicinity of the wall of the transparent container by the optical condensing system (such as a convex lens) on the transparent container side. When light is focused, the intensity of light per unit area is increased. As a result, the photo-curable resin solution in the transparent container is fixed to the inner wall of the transparent container more rapidly and more firmly. Thus, an optical waveguide device strong against disturbance such as vibration can be manufactured.

Incidentally, the optical condensing system may be disposed on the light source side if the light inlets of the jig are transparent.

The optical waveguide device manufacturing jig as in (4) is a jig for manufacturing an optical waveguide device as defined in any one of (1) through (3), further having an adjusting device for adjusting a position and/or an angle of the optical component relative to the optical axis of the light guided into the transparent container.

The adjusting device is constituted by a combination of soft magnetic materials mounted on the bottom portions of the optical components respectively and magnets attached to the outside of the bottom portion of the housing. For example, the soft magnetic materials and the magnets are fixed adjustably so that the bottom portion of the transparent container and the bottom portion of the housing are sandwiched between the soft magnetic materials and the magnets by magnetic force. To adjust the optical component, for example, light at a wavelength incapable of curing the photo-curable resin solution is guided into the transparent container. If the optical component is displaced from the optical axis, the magnets are moved in parallel to thereby adjust the optical component from the outside. Further, if the angle of the optical component is displaced from the optical axis, the optical component can be adjusted by rotating the magnets. That is, the optical component can be adjusted in the state that the transparent container is filled with the photo-curable resin solution. Hence, an optical waveguide device can be manufactured with higher accuracy.

The optical waveguide device manufacturing jig as in (5) is a jig for manufacturing an optical waveguide device as defined in any one of (1) through (4), wherein the housing containing the predetermined number (N) of light inlets can be separated into a plurality of parts.

Because the housing can be separated into a plurality of parts, the jig can be adapted to various shapes of transparent containers. For example, housing parts may be positioned, so that light at a predetermined wavelength is guided into the transparent container through light inlets of one housing part separated thus while the guided light is output through light inlets of the other housing part. The jig can be used for various shapes of transparent containers. That is, various shapes of optical waveguide devices can be manufactured by the optical waveguide device manufacturing jig.

The optical waveguide device manufacturing method as in (6) is a method of manufacturing an optical waveguide device formed by use of an optical waveguide device manufacturing jig defined in anyone of (1) through (5). First, at least one optical component is inserted in a transparent container at a predetermined position. Then, the transparent container is filled with a photo-curable resin solution. Then, the optical waveguide device manufacturing jig defined in any one of (1) through (5) is mounted on the transparent container. Then, light at a predetermined wavelength is guided into the transparent container through arbitrary light inlets of the optical waveguide device manufacturing jig. The "light at a predetermined wavelength" is, for example, short-wave laser light. The light at the predetermined wavelength makes the photo-curable resin solution cause photo-polymerization reaction in the direction of the optical axis successively. In this manner, there can be formed an optical waveguide device in which the optical component is connected to the predetermined number (N) of light inlets by the optical waveguides. The predetermined number (N) of light inlets serve as input ports and/or output ports in the optical waveguide device completed. When the jig according to the invention is used, a high-precision optical waveguide device can be formed because the light inlets, that is, input and output ports are positioned in advance accurately. In addition, the optical waveguide device can be formed easily.

The optical waveguide device manufacturing method as in (7) is a method of manufacturing an optical waveguide device as defined in (6), wherein each of the light inlets in the optical waveguide device manufacturing jig mounted on the outside of the transparent container is provided with a hole formed in the light inlet so that an optical fiber through which the light at the predetermined wavelength is output is fitted into the hole. That is, when optical fibers are inserted into the light inlets and light is guided into the transparent container through the optical fibers, the optical waveguide device can be formed easily and accurately. Moreover, the optical fibers are excellent in flexibility. Hence, this method can improve the workability in the process of manufacturing the optical waveguide device.

The optical waveguide device manufacturing method as in (8) is a method of manufacturing an optical waveguide device as defined in (6) or (7), wherein at least opposite two ends of each of the optical waveguides are fixed to the transparent container.

Generally, the photo-curable resin solution is solidified while having adhesiveness when cured. That is, the optical waveguides are fixed to a medium which abuts on the photo-curable resin solution. According to the invention, the photo-curable resin solution is injected into the transparent container and light at a predetermined wavelength is input-output through all the predetermined number (N) of light inlets provided in the optical waveguide device manufacturing jig. Hence, optical waveguides formed are at least fixed to the transparent container. Because opposite ends of each of the optical waveguides are fixed to the transparent container, an optical waveguide device strong against vibration or the like can be formed. That is, this method of manufacturing a strong optical waveguide device can be achieved.

The optical waveguide device manufacturing method as in (9) is a method of manufacturing an optical waveguide device as defined in any one of (6) through (8), wherein the position and/or angle of the optical component inserted in the transparent container can be adjusted from the outside of the transparent container. For example, an adjusting device is constituted by a combination of soft magnetic materials mounted on the bottom portions of optical components and magnets attached to the outside of the bottom portion of the housing. The soft magnetic materials and the magnets are fixed adjustably so that the transparent container and the housing can sandwiched between the soft magnetic materials and the magnets by magnetic force. The positional and/or angular adjustment of the optical component is carried out by the adjusting device after the photo-curable resin solution is injected into the transparent container, so that light input through one light inlet of the predetermined number (N) of light inlets is output through another light inlet of the predetermined number (N) of light inlets while the light has a wavelength incapable of curing the photo-curable resin solution. When, for example, the positional displacement of the output position is positional displacement from the optical axis of the optical component, the magnets are moved in parallel to thereby adjust the output position. When, for example, the positional displacement is angular displacement from the optical axis of the optical component, the magnets are rotated to thereby adjust the angle. That is, the optical component can be adjusted in the state that the transparent container is filled with the photo-curable resin solution. Hence, a method of manufacturing an optical waveguide device easily and accurately can be achieved.

The optical waveguide device manufacturing method as in (10) is a method of manufacturing an optical waveguide device as defined in any one of (6) through (9), further having the steps of: removing an uncured part of the photo-curable resin solution in surroundings of the optical waveguides from the transparent container after the formation of the optical waveguides; and then embedding the optical waveguides in a low-refractive-index resin solution having a refractive index lower than that of each of the formed optical waveguides and solidifying the low-refractive-index resin solution. On this occasion, the low-refractive-index resin solution may be a photo-curable resin solution or a heat-curable resin solution. When the low-refractive-index resin solution is a photo-curable resin solution, the low-refractive-index resin solution is solidified, for example, by ultraviolet light. When the low-refractive-index resin solution is a heat-curable resin solution, the low-refractive-index resin solution is solidified by heat.

When, for example, the resin solution for forming optical waveguides is a high-refractive-index photo-curable resin solution and the solution for solidifying the whole inside the transparent container is a low-refractive-index resin solution, the low-refractive-index resin solution is selected in accordance with the refractive index of the high-refractive-index photo-curable resin solution cured. That is, for example, the low-refractive-index resin solution is set so that step-index optical waveguides with low loss can be formed. Because step-index optical waveguides can be formed, transmission loss can be reduced. Moreover, because the whole inside the transparent container is solidified, a strong optical waveguide device can be formed. That is, the optical waveguide device can be manufactured as a device strong against the influence on disturbance such as vibration and low in loss.

The optical waveguide device manufacturing method as in (11) is a method of manufacturing an optical waveguide device as defined in (10), wherein the low-refractive-index resin solution is a photo-curable or heat-curable resin solution which is highly mutually soluble in the photo-curable resin solution used for the formation of the optical waveguides.

When optical waveguides are formed on the basis of the photo-curable resin solution, the photo-curable resin solution still remains on surfaces of the optical waveguides even after the removal of the photo-curable resin solution. Generally, the remaining solution causes transmission loss of the optical waveguides. According to the invention, a low-refractive-index resin solution having mutual solubility in the photo-curable resin solution in this state is injected. Because the low-refractive-index resin solution has such mutual solubility, the photo-curable resin solution remaining on the surfaces of the optical waveguides is dissolved in the low-refractive-index resin solution contained. That is, the surfaces of the optical waveguides are made substantially smooth and uniform. When the surfaces are uniform, loss due to propagation (total reflection) is reduced. That is, a low-loss optical waveguide device can be manufactured.

Generally, a cleansing step is required after the removal of the photo-curable resin solution. According to the invention, since a low-refractive-index resin solution having mutual solubility in the photo-curable resin solution is used, there is also an effect that the cleansing effect can be omitted.

The optical waveguide device manufacturing method as in (12) is a method of manufacturing an optical waveguide device as defined in any one of (6) through (9), wherein: the photo-curable resin solution is a mixture solution of a high-refractive-index photo-curable resin solution and a low-refractive-index photo-curable resin solution different in curing initiating wavelength. Parallel light at a first predetermined wavelength capable of curing only the high-refractive-index photo-curable resin solution is guided into the transparent container through arbitrary light inlets of the predetermined number (N) of light inlets to form the optical waveguides. After the formation of the optical waveguides, light at a second predetermined wavelength capable of curing both the high-refractive-index photo-curable resin solution and the low-refractive-index photo-curable resin solution is radiated onto the whole uncured part of the mixture solution in surroundings of the optical waveguides to thereby solidify the mixture solution.

For example, light at a wavelength $\lambda_W$ ($\lambda_2 < \lambda_W < \lambda_1$) capable of curing only the high-refractive-index photo-curable resin solution is guided into the mixture solution. In this case, the wavelength $\lambda_1$ is a wavelength for initiating curing of the high-refractive-index photo-curable resin solution, and the wavelength $\lambda_2$ is a wavelength for initiating curing of the low-refractive-index photo-curable resin solution. The light at the wavelength $\lambda_W$ is short-wave laser light such as argon ion laser light. Hence, only the high-refractive-index photo-curable resin solution in the mixture solution is cured by photo-polymerization reaction, so that optical waveguides are formed. On this occasion, the mixture solution constituted by these two kinds of photo-curable resin solutions remains on the outer circumferences of the optical waveguides.

Then, light of a wavelength band $\lambda_C$ ($\lambda_C < \lambda_2$) capable of curing the two kinds of photo-curable resin solutions is radiated from surroundings of the mixture solution by an ultraviolet lamp or the like so that the remaining mixture solution is solidified by photo-polymerization reaction similarly. As a result, clad portions are formed around the optical waveguides (core portions) respectively, so that so-called step-index optical waveguides are formed. The optical waveguides formed thus, the optical component and the container are solidified as a whole. Also as a result, a strong optical waveguide device can be manufactured. In the producing method according to the invention, the step of exchanging the photo-curable resin solution for a new one is not required. Hence, a manufacturing method with improved workability efficiency can be achieved.

The optical waveguide device manufacturing method as in. (13) is a method of manufacturing an optical waveguide device as defined in any one of (6) through (12), wherein the predetermined wavelength used for the formation of the optical waveguides is set to be different from the wavelengths of optical signals which are used after the optical waveguide device is formed. The photo-curable resin solution for forming optical waveguides absorbs energy of light at a predetermined wavelength so as to be solidified. That is, a wavelength which can be easily absorbed to the photo-curable resin solution is selected as the light at the predetermined wavelength when optical waveguides are formed. This means that the optical waveguides formed thus can easily absorb the light at the predetermined wavelength though the absorption rate is slight. Accordingly, light at a wavelength different from the predetermined wavelength is used for the optical waveguide device completed. In other words, light at a predetermined wavelength different from the wavelength of an optical signal used after the formation of the optical waveguide device is used for forming the optical waveguides. For example, light at a wavelength shorter than the wavelength used in an optical signal (in a range of from infrared light to visible light) is used. In this manner, a low-loss optical waveguide device can be formed.

The optical waveguide device as in (14) is an optical waveguide device manufactured by use of an optical waveguide device manufacturing jig defined in anyone of (1) through (5) and an optical waveguide device manufacturing method defined in any one of (6) through (13), wherein optical elements and/or photoelectric conversion elements are coupled with the input-output ends of the optical waveguide device.

Examples of the optical elements include elements such as lenses, filters, and optical fibers. These elements are fixed, for example, by a transparent adhesive agent. In this manner, the optical waveguide device can be provided as a device smaller in size and easy to handle.

Examples of the photoelectric conversion elements include light-emitting elements such as laser diodes, and light-receiving elements such as photo-diodes. When these elements are coupled with the input-output ends of the optical waveguide device, various transmitting/receiving devices can be formed. When, for example, light-receiving elements are coupled with the input-output ends, a receiving device in optical communication can be formed. When, for example, light-emitting elements are coupled with the input-output ends, a communication device in optical communication can be formed.

BRIEF DESCRIPTION OF THE DRAWINGS

FIG. 5 is a view showing the arrangement of a jig for manufacturing an optical waveguide device according to a modification;

DETAILED DESCRIPTION OF THE PREFERRED EMBODIMENTS

The invention will be described below based on specific embodiments. The invention is however not limited to the following embodiments.

(First Embodiment)

Figure 1A:
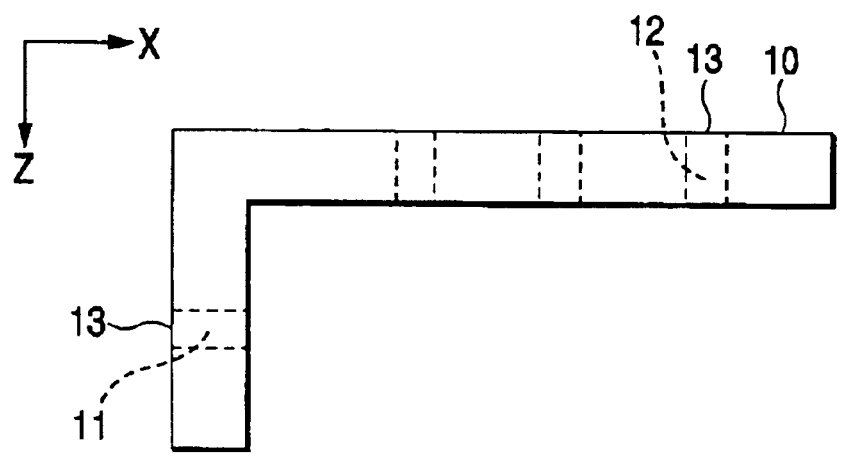
FIGS. 1A and 1B are a top view and a front view respectively showing a jig for manufacturing an optical waveguide device according to a first embodiment.
Figure 1B:
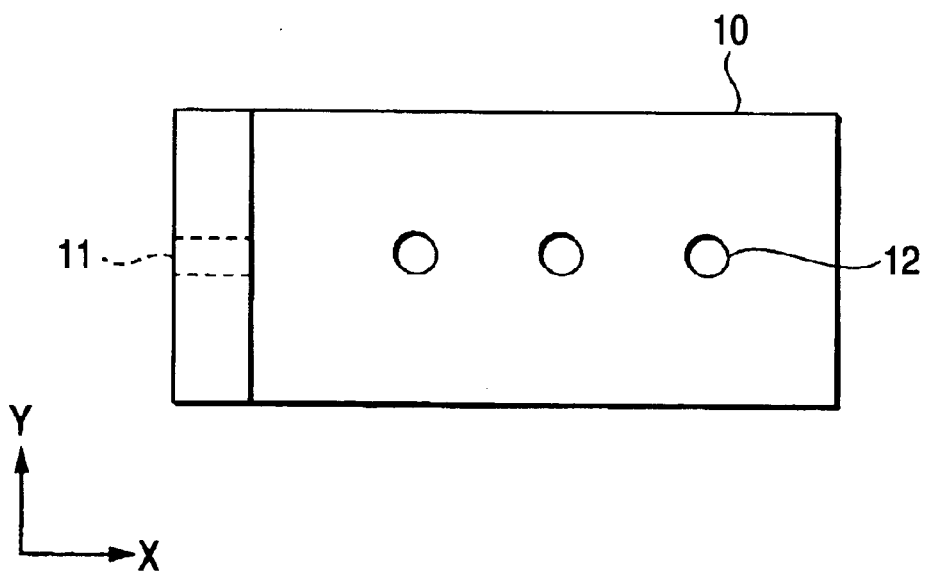
Figure 2A:
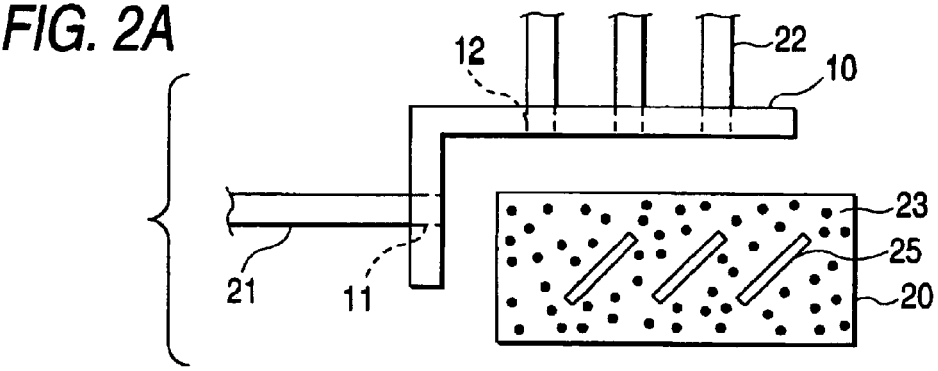
FIGS. 2A through 2e are step views showing processes for manufacturing the optical waveguide device according to the first embodiment.
Figure 2B:
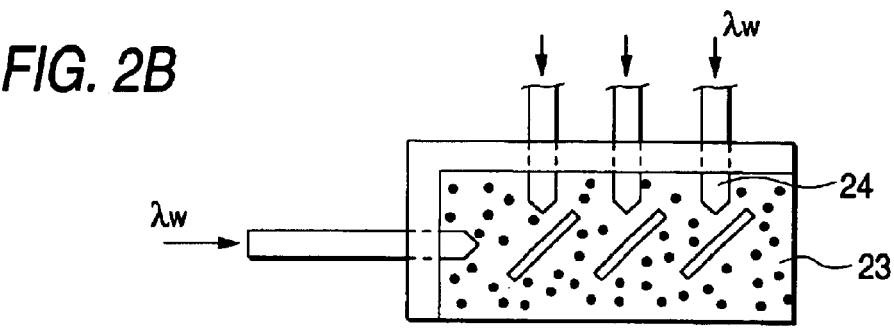
Figure 2C:
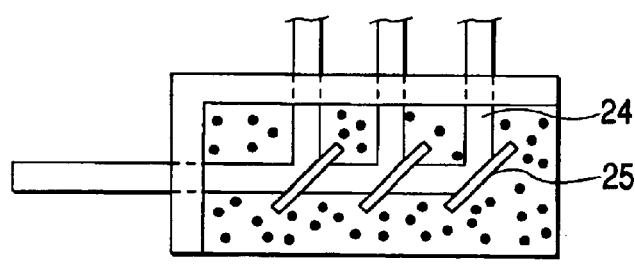
Figure 2D:
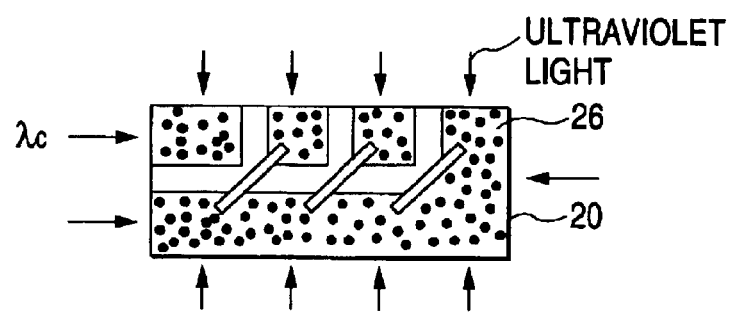
Figure 2E:
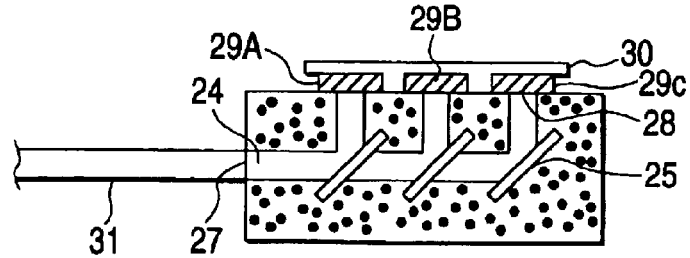

FIGS. 1A and 1B show a jig for manufacturing an optical waveguide device according to this embodiment. By use of the jig, an optical waveguide device which will be described later is manufactured. Incidentally, FIG. 1A is a top view, and FIG. 1B is a front view. The optical waveguide device manufacturing jig according to this embodiment includes a housing 10, and a hole 11 and holes 12 formed in light inlets 13 of the housing 10. On this occasion, the hole 11 and the holes 12 are processed with high accuracy in alignment with positions of photoelectric conversion elements which will be described later. That is, the position of the hole 11 relative to the holes 12 and the perpendicularity of the hole 11 to the holes 12 are made highly accurate. For example, an error of the Y ordinate in the coordinates of the center of each of the holes 11 and 12 is set by precision processing so as to be in the range of from the order of several microns to the order of tens of microns. Further, the perpendicularity of the hole 11 to the holes 12, that is, the angle between the center line of the hole 11 and the center line of each of the holes 12 is set to be, for example, in a range of the order of tens of seconds to the order of hundreds of seconds. In such a manner, when, for example, optical fibers are fitted into the holes 11 and 12 respectively, light (such as laser light) output from the forward end of the optical fiber fitted into the hole 11 and light (such as laser light) output from the respective forward ends of the optical fibers fitted into the holes 12 cross each other exactly at about 90 degrees. The optical waveguide device according to this embodiment is formed by use of such a jig. Accordingly, any operating person need not adjust the positional or angular relation between the optical fibers. By a simple method of guiding light at a predetermined wavelength into a photo-curable resin solution from optical fibers fitted into the jig to thereby carry out a predetermined step which will be described later, an optical waveguide device can be produced with high accuracy.

FIG. 2 is a step view showing a method of manufacturing an optical waveguide device according to this embodiment of the invention. The fundamental manufacturing method is a so-called stereo lithography method in which short-wave laser light is guided into a photo-curable resin so that the resin is cured by photo-polymerization reaction. The different point of the method according to the invention from the stereo lithography method is in that optical waveguides can be formed autonomously without any movable portion. First, in step (a), the housing 10 of the optical waveguide device manufacturing jig is provided with optical fibers 21 and 22, for example, each made of quartz and having a core diameter of 100 μm and a clad diameter 140 μm. That is, the optical fiber 21 is fitted into the hole 11 in the housing 10, while the optical fibers 22 are fitted into the holes 12 in the housing 10. On the other hand, for example, interference filters 25 which are optical components are inserted in predetermined positions of a transparent container 20, and the transparent container 20 is filled with an acrylic photo-curable resin solution 23 which has a high refractive index and which exhibits radical polymerization reaction when irradiated with light. The housing 10 provided with the optical fibers 21 and 22 is mounted on the transparent container 20. The transparent container is, for example, an acrylic container shaped like a rectangular parallelepiped with a 0.5 mm thickness. Then, the process shifts to step (b)

In the step (b), light at a predetermined wavelength, for example, short-wave laser light (wavelength $\lambda_W$) is guided into the optical fibers 21 and 22. The short-wave laser light is, for example, argon ion laser light at a wavelength $\lambda_W$=488 nm. The light at a predetermined wavelength (wavelength $\lambda_W$) is output with output intensity of about 150 mW from the forward end of each of the optical fibers 21 and 22 so that the photo-curable resin solution 23 is polymerized and cured. On this occasion, the refractive index of the forward end portion of each of optical waveguides 24 is increased by curing of the photo-curable resin solution 23. Hence, each of the optical waveguides 24 grows continuously (self-forming type optical waveguides) while the guided light is confined in the optical waveguide 24 on the basis of the self-focusing effect. As shown in step (c), the optical waveguides 24 then reach, for example, the interference filters 25 erected at intervals of 5 mm. Each of the interference filters 25 is a semi-transparent mirror to other wavelengths than the interference wavelength. That is, when setting is made such that the predetermined wavelength of the guided light is different from the interference wavelength, each of the interference filters 25 reflects a part of the light and transmits the other part of the light. That is, the optical waveguides 24 are formed successively along the reflection path and the transmission path of the light. Then, optical waveguides 24 grown from different paths are led into each other by the self-alignment effect, so that the optical waveguides 24 are coupled with each other. When all the optical waveguides 24 are coupled with one another, laser irradiation through the optical fibers 21 and 22 is stopped. The diameter of each of the optical waveguides 24 formed on this occasion is about 120 μm and the transmission loss to a wavelength of 850 nm is about 0.8 dB/cm. Further, the loss in each of the interference filters 25 is about 0.5 dB/cm. The process shifts to step (d).

In the step (d), the photo-curable resin solution 23 is removed from the transparent container 20, and a low-refractive-index photo-curable resin solution 26 which is a fluorinated acrylic resin solution lower in refractive index than each of the optical waveguides 24 is injected in the transparent container 20. On this occasion, the optical waveguides 24 have end portions fixed to the transparent container 20, and center portions fixed to the interference filters 25, respectively. Accordingly, when the solution is exchanged for a new one, there is no fear that the optical waveguides 24 are deformed and detached. In addition, the optical waveguides 24 are strong against mechanical vibration or the like. On this occasion, it is preferable that the low-refractive-index photo-curable resin solution 26 to be exchanged for is mutually soluble in the photo-curable resin solution 23 used for forming the optical waveguides. When the photo-curable resin solutions having mutual solubility in each other are used, a part of the photo-curable resin solution 23 does not remain on the surfaces of the optical waveguides at the time of solution exchange so that the surfaces of the optical waveguides 24 can be formed to be smooth. Accordingly, the optical waveguides which are reduced in transmission loss can be formed.

Further, when solution exchange is carried out, a step of cleansing the container with a solvent is generally required. Because of this step, manufacturing cost is increased accordingly. Since the low-refractive-index photo-curable resin solution 26 highly mutually soluble in the photo-curable resin solution 23 is injected in the container in the step (d) of the embodiment, the cleansing step can be also omitted. Accordingly, the manufacturing cost becomes more inexpensive.

Next, the low-refractive-index photo-curable resin solution 26 is irradiated with ultraviolet light (wavelength $\lambda_C$), for example, by an ultraviolet lamp or the like. That is, the low-refractive-index photo-curable resin solution 26 is cured and solidified wholly. Accordingly, clads are formed in the surroundings of the optical waveguides 24, so that step-index optical waveguides can be formed. On this occasion, the surface of each of the optical waveguides 24 is smooth as described above, and has a sharp change in refractive index in the radial direction. That is, more perfect step-index optical waveguides can be formed with lower loss (about 0.5 dB/cm). In addition, because the whole of the low-refractive-index photo-curable resin solution 26 is solidified, firm optical waveguides can be formed.

In order to minimize the transmission loss of each of the optical waveguides 24, the low-refractive-index photo-curable resin solution 26 may be selected so that the difference between the refractive index of the optical waveguide 24 (refractive index of the core portion) and the refractive index of the low-refractive-index photo-curable resin solution 26 (refractive index of the clad portion) after curing is maximized. As an example, when an acryl-based resin is used in the photo-curable resin solution 23 (photo-curable resin solution for the core), an epoxy resin, an oxetane resin, a silicon resin as well as the acryl-based resin may be used in the low-refractive-index photo-curable resin solution 26 (photo-curable resin solution for a clad material). When any one of these low-refractive-index resin solutions is used, optical waveguides with low loss can be obtained. The process shifts to the final step (e).

In the step (e), an optical waveguide device is produced. An example of the optical waveguide device is an optical waveguide type receiving sensor. That is, a new optical fiber 31 is mounted (bonded) onto an input port 27 of the optical waveguide 24, and light-receiving elements (photo diodes) $29_A$, $29_B$ and $29_C$ which are, for example, photoelectric conversion elements are provided at output ports 28 of the optical waveguides 24, respectively. Incidentally, the reference numeral 30 designates a lead frame for the light-receiving elements 29. In such a manner, an optical waveguide type receiving sensor can be formed.

For example, optical signals having wavelengths $\lambda_A$, $\lambda_B$ and $\lambda_C$ as carrier wavelengths are guided into the optical fiber 31 of the optical waveguide type receiving sensor. The optical signals at the wavelengths $\lambda_A$, $\lambda_B$ and $\lambda_C$ input from the optical fiber 31 are reflected by the interference filters 25 so as to be received by the light-receiving elements $29_A$, $29_B$ and $29_C$ respectively. That is, the optical waveguide type receiving sensor is formed as an optical frequency multiplexing optical waveguide type receiving sensor. In this embodiment, the optical waveguide device manufacturing jig 10 shown in FIGS. 1A and 1B is used, so that the device can be manufactured easily and accurately.

Preferably, each of the wavelengths $\lambda_A$, $\lambda_B$ and $\lambda_C$ is a wavelength longer than the predetermined wavelength $\lambda_W$. If each of the wavelengths $\lambda_A$, $\lambda_B$ and $\lambda_C$ is equal to near to the wavelength (predetermined wavelength) $\lambda_W$ used for forming the optical waveguides, the light is apt to be absorbed to the optical waveguides 24 so that the transmission loss becomes large. For example, when the optical waveguides 24 are formed at a wavelength of 488 nm, the transmission loss at the wavelength of 488 nm is 5 dB/cm. When the optical waveguides 24 are formed at a wavelength of 670 nm, the transmission loss is 1.3 dB/cm. In addition, when the optical waveguides 24 are formed at a wavelength of 850 nm, the transmission loss is 0.8 dB/cm. Accordingly, when the optical waveguides are formed at the wavelength of 488 nm, the wavelength used in the optical waveguide device (communication wavelength when the optical waveguide device is a communication device) is preferably, for example, in a range of from 600 nm to 1,500 nm. Thus, an optical waveguide device with low transmission loss can be formed.

(Second Embodiment)

The first embodiment was an example in which the optical waveguides (core portions) were formed from the photo-curable resin solution whereas the clad portions were formed from the low-refractive-index photo-curable resin solution which was solidified after the photo-curable resin solution was exchanged for the low-refractive-index photo-curable resin solution. On the other hand, the second embodiment is an example in which a mixture solution obtained by mixing two kinds of photo-curable resin solutions different from each other both in wavelength for initiating curing and in refractive index after curing is used so that the solution exchange step is omitted. That is, in the second embodiment, after the step (c) of the first embodiment as shown in FIG. 2, the process shifts to the ultraviolet irradiation step (d) immediately without exchange of the solution. In addition, in the second embodiment, the housing 10 of the jig for manufacturing the optical waveguides in the first embodiment is separated into housing parts 10a and 10b in order to manufacture the optical waveguide device more efficiently.

Figure 3:
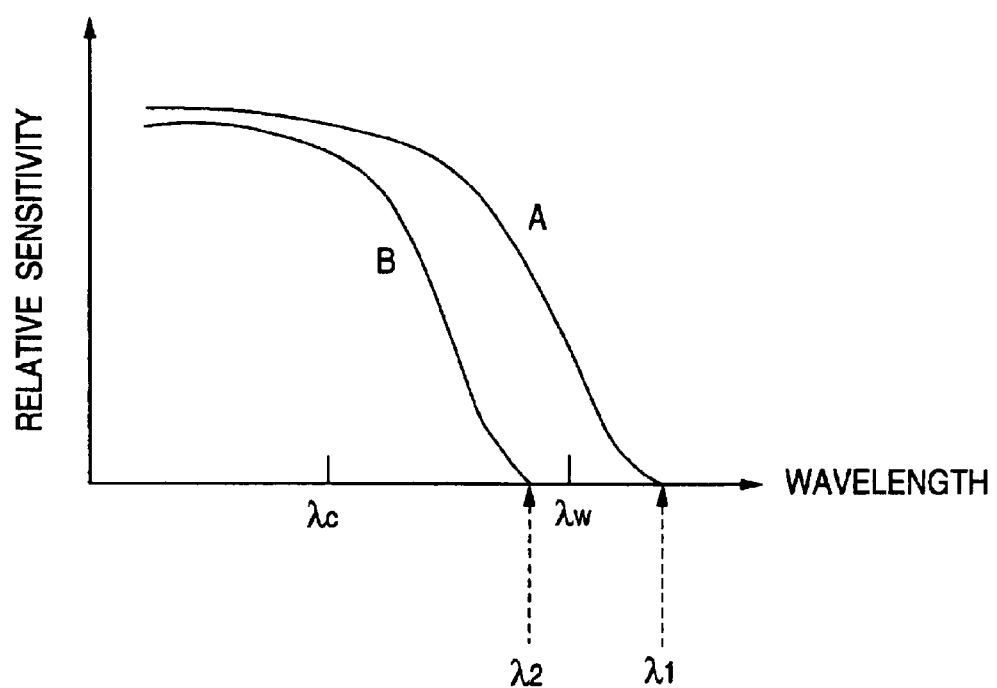
FIG. 3 is a characteristic graph showing spectral sensitivity of a mixture solution according to a second embodiment.
Figure 4A:
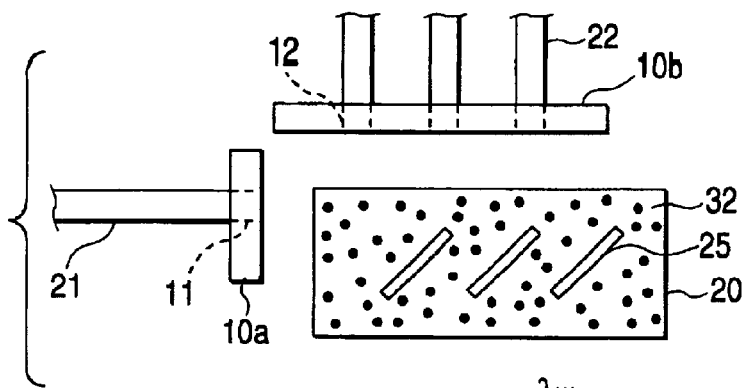
FIGS. 4A through 4e are step views showing processes for manufacturing the optical waveguide device according to the second embodiment.
Figure 4B:
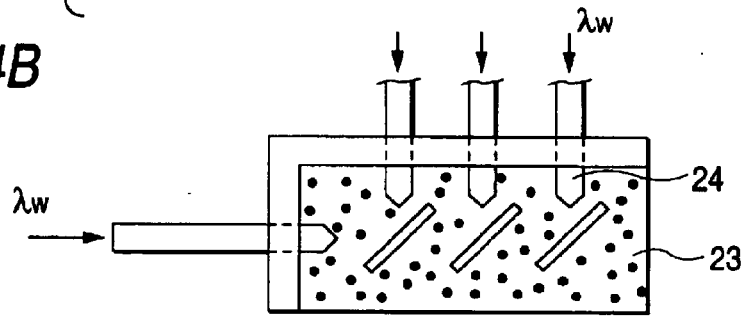
Figure 4C:
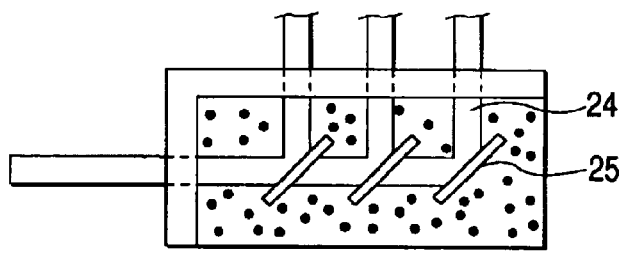
Figure 4D:
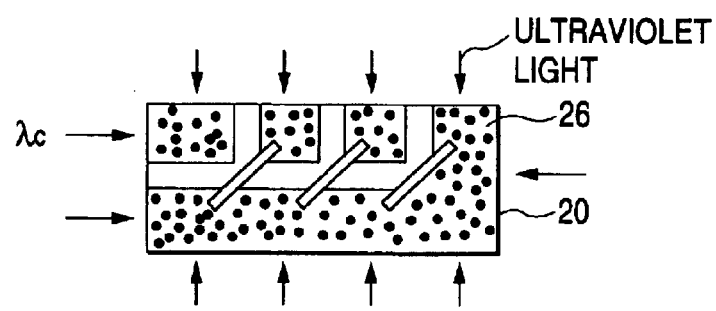
Figure 4E:
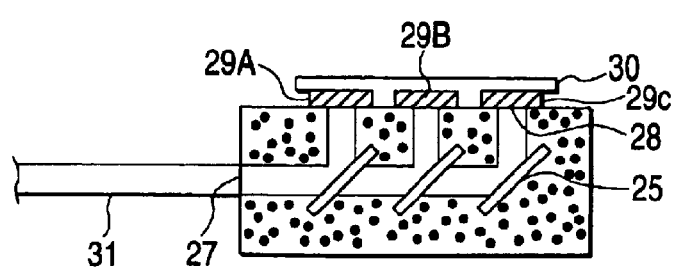

For this reason, two kinds of photo-curable resin solutions different from each other both in wavelength for initiating curing and in refractive index after curing, that is, a high-refractive-index photo-curable resin solution and a low-refractive-index photo-curable resin solution are mixed with each other. The mixture solution is prepared as a photo-curable resin solution for the stereo lithography method. For example, the high-refractive-index photo-curable resin solution is an acryl-based photo-curable resin solution exhibiting a radical polymerization reaction whereas the low-refractive-index photo-curable resin solution is an epoxy-based photo-curable resin solution exhibiting a cationic polymerization reaction. The two kinds of photo-curable resin solutions are mixed with each other, for example, at a ratio of 7:3 to prepare a mixture solution 32. FIG. 3 shows spectral sensitivity characteristic for the two kinds of photo-curable resin solutions. In FIG. 3, the horizontal axis indicates wavelength and the vertical axis indicates relative sensitivity. A curve A shows the spectral sensitivity characteristic for the high-refractive-index photo-curable resin solution while a curve B shows the spectral sensitivity characteristic for the low-refractive-index photo-curable resin solution.

As shown in FIG. 3, curing initiating wavelengths $(\lambda_1, \lambda_2)$ for the two kinds of photo-curable resin solutions respectively are designed such that the wavelength $\lambda_W$ of the short-wave laser light to be used is located between the curing initiating wavelengths $(\lambda_1, \lambda_2)$. Hereinafter, the high-refractive-index photo-curable resin solution will be referred to as "a solution A", and the low-refractive-index photo-curable resin solution will be referred to as "a solution B".

In this embodiment, such a mixture solution 32 is used to manufacture the optical waveguides. The manufacturing steps will be described with reference to FIG. 4. Incidentally, because the optical components such as the optical waveguide forming jig 10, the optical fibers 21 and 22, and the interference filters 25 are disposed in the same manner as in the first embodiment, detailed description on the installation of these optical components will be omitted. In addition, the housing 10 used in this embodiment is formed as a combination of housing parts separable to sustain a degree of freedom.

First, in step (a), the transparent container 20 is filled with the mixture solution 32. Next, in step (b), these separate jig parts are mounted on the transparent container 20 and light at a predetermined wavelength (argon ion laser light: $\lambda_W$=488 nm) is guided into the transparent container 20. This wavelength is shorter than the curing initiating wavelength of the solution A and longer than that of the solution B, as described above. Accordingly, only the solution A is cured so that optical waveguides 24 are formed. Incidentally, on this occasion, the solution B on the optic axis is pushed aside. The optical waveguides 24 from different directions are led into each other on the basis of the self-alignment effect, so that the optical waveguides 24 are formed as continuous optical waveguides. Then, in step (c), guiding of light at the predetermined wavelength (wavelength $\lambda_W$) is stopped so that the process shifts to step (d).

In the step (d), ultraviolet light at a wavelength $\lambda_C$ is radiated evenly from the surroundings of the transparent container 20 by an ultraviolet lamp or the like. As shown in FIG. 3, this wavelength $\lambda_C$ is shorter than the curing initiating wavelength of the solution A and shorter than that of the solution B. Accordingly, both the solutions A and B are cured. In such a manner, the whole of the mixture solution 32 in the surroundings of the optical waveguides 24 is cured so that clad portions are formed on the optical waveguides 24 respectively. On this occasion, the refractive index of each clad portion is lower than that of each of the optical waveguides 24 (core portions). That is, step-index optical waveguides are formed. Incidentally, because the next step (e) in this embodiment is identical to that in the first embodiment, the description of the step (e) will be omitted here.

When two kinds of photo-curable resin solutions different from each other both in curing initiating wavelength and in refractive index after curing are mixed with each other and irradiated with two kinds of light different in wavelength in two steps in such a manner, step-index optical waveguides can be formed easily. In addition, an optical waveguide device can be manufactured by use of the step-index optical waveguides.

(Modification)

Although the embodiments expressing the invention have been described above, various modifications can be conceived. For example, in the first embodiment and the second embodiment, there has been adopted a method in which light at the predetermined wavelength is guided into the container through all of the holes 11 and 12 so that the optical waveguides 24 are connected to each other at midpoints. The adoption of the holes 11 and 12 may be optional. That is, all light at the predetermined wavelength need not be guided from two-way directions. The light at the predetermined wavelength may be partially guided from one-way direction. For example, when the light-receiving area of the light-receiving element 29, shown in the step (e) of FIG. 2 or in the step (e) of FIG. 4 is large, or when the distance between the hole 11 and the holes 12 is short, that is, when the optical path is short, the light at the predetermined wavelength may be guided only through the hole 11. When the arrangement is made in this manner, it will also go well.

Although the second embodiment has been described upon the case where the housing 10 in the first embodiment is separated into the housing parts 10a and 10b and both the housing parts 10a and 10b are finely adjusted for determining the input-output positions to form the optical waveguides 24, the invention may be applied also to the case where only one of the housing parts 10a and 10b is adjusted. In addition, for example, the housing part 10a need not be provided. That is, as shown in FIG. 5, a hole 41 corresponding to the hole 11 of the housing part 10a may be formed in a side wall of the transparent container so that the optical fiber 21 is fitted into the hole 41. The optical waveguide device manufacturing jig may be made up of only a housing part 10b and holes 12. The input-output positions can be set easily by a simple method of finely adjusting only the housing part 10b.

In this case, there can be formed a device in which an optical waveguide 24 is extended from the forward end of the optical fiber 21 and in which the optical waveguide device and the optical fiber 21 are integrated with each other. Accordingly, a device with lower connection loss can be formed. For example, an optical waveguide device having an extremely low connection loss of 0.1 dB can be formed. In such a manner, by use of the optical waveguide device manufacturing jig made up of only the housing part 10b, a device integrated with the optical fiber 21 may be manufactured.

Figure 6A:
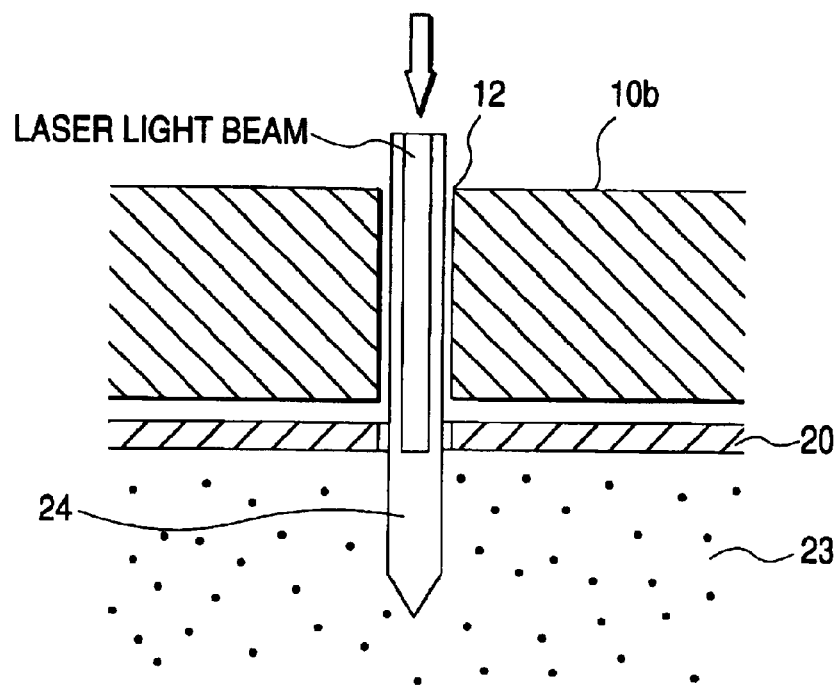
FIGS. 6A and 6B are views showing the formation of optical waveguides in the case where a laser light beam according to the modification is guided.

Although the first and second embodiments have been described upon the case where the optical waveguides 24 are grown from the optical fibers 21 and 22, the invention may be applied also to the case where the optical fibers are not used. For example, as shown in FIG. 6A, argon ion laser light (200 mW) 3 mm wide in terms of full width at half maximum (FWHM) may be used as the light at the predetermined wavelength so that the light can be guided through the hole 12. The optical waveguides 24 each having a diameter ranging from about 2 mm to about 3 mm can be obtained. Such an optical waveguide device may be formed.

In addition, the light at the predetermined wavelength need not be short-wave laser light. For example, light of an ultraviolet lamp may be extracted from two or more apertures to thereby form substantially parallel light as the light at the predetermined wavelength. This substantially parallel light may be guided through the hole 12 as shown in each of FIGS. 6A and 6B. Also in this case, the same effect can be obtained.

Figure 6B:
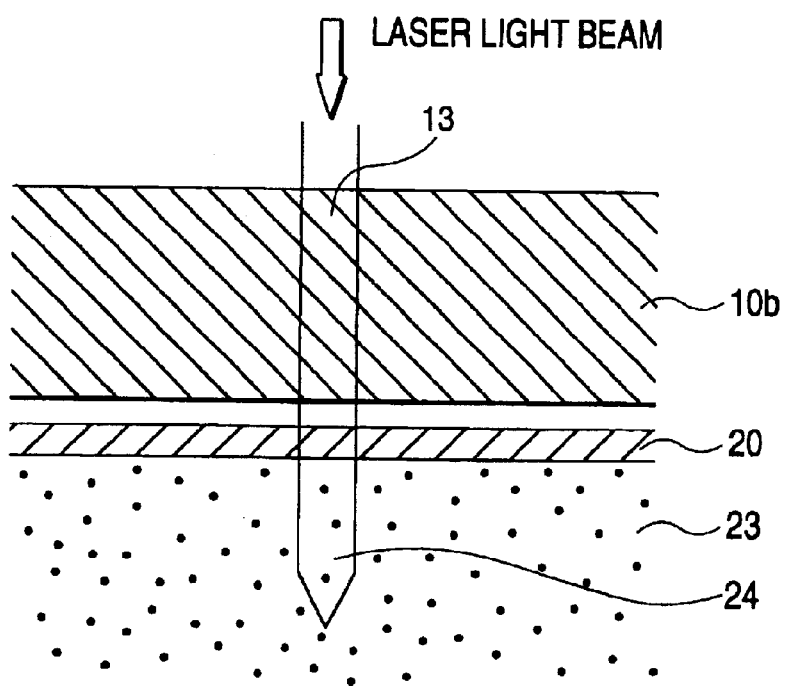

Further, in the case where such laser light or lamp light is used, it is unnecessary to provide any hole in the jig. Hence, if the light inlet is transparent, the same optical waveguide can be formed also in an irradiation system as shown in FIG. 6B.

Figure 7A:
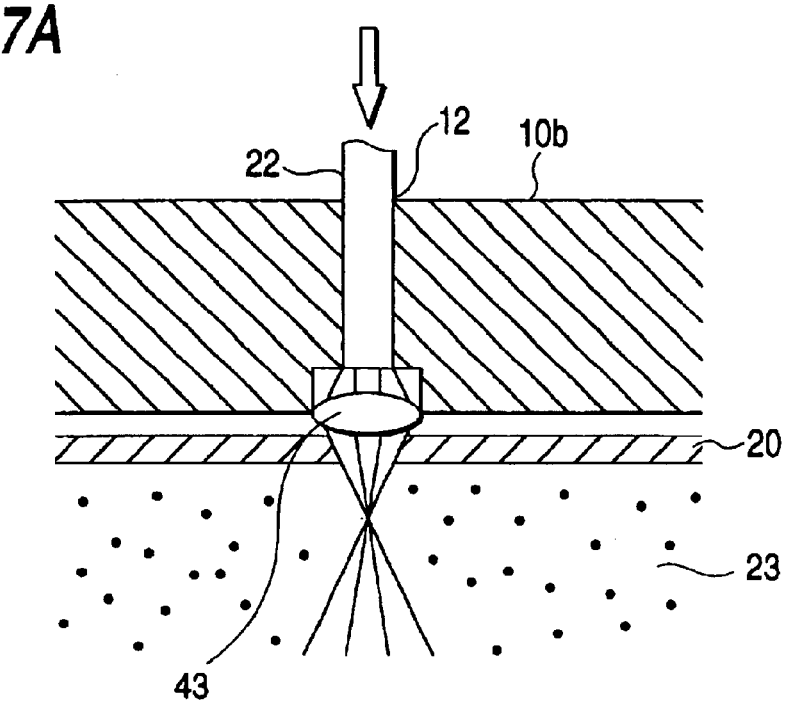
FIGS. 7A and 7B are views showing the formation of one of optical waveguides in the case where the jig for manufacturing an optical waveguide device is provided with a convex lens as another modification.
Figure 7B:
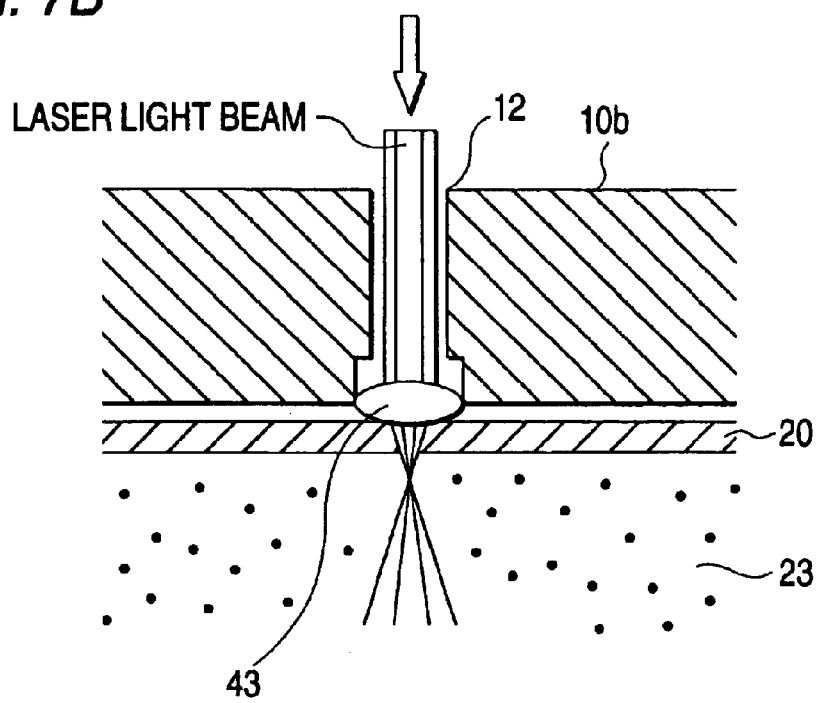

Although the first and second embodiments have been described upon the case where optical focusing systems such as convex lenses are not provided in the holes 11 and 12 of the housing 10, the invention may be applied also to the case where a convex lens 43 (numerical aperture: 0.25) may be provided on the transparent container 20 side of each hole 12 as shown in FIGS. 7A and 7B. FIG. 7A shows the case where an optical fiber 22 is used, and FIG. 7B shows the case where a laser light beam having about 3 mm as an FWHM is used. When the convex lens 43 is provided on the transparent container 20 side of the hole 12, laser light output from the optical fiber 22 can be focused, for example, on the vicinity of the wall of the transparent container 20 (FIG. 7A). Similarly, the laser light beam having about 3 mm as the FWHM can be focused on the vicinity of the wall of the transparent container 20 (FIG. 7B). When the laser light beam is focused as described above, light intensity on the focusing portion is increased so that the photo-curable resin solution can be solidified more speedily and with higher hardness. Optical waveguides 24 can be fixed more firmly to the inner wall of the transparent container 20. Because the optical waveguides 24 are fixed more firmly to the inner wall of the transparent container 20, an optical waveguide device strong against mechanical vibration can be formed. When a lens long in focal length is used, the installation position of the lens may be located on the side (light source side) opposite to the container 20 side. In addition, as described above, if the light inlet is transparent, it is unnecessary to provide any hole and it may be possible to install the lens in any position on the path of the laser light.

Figure 8:
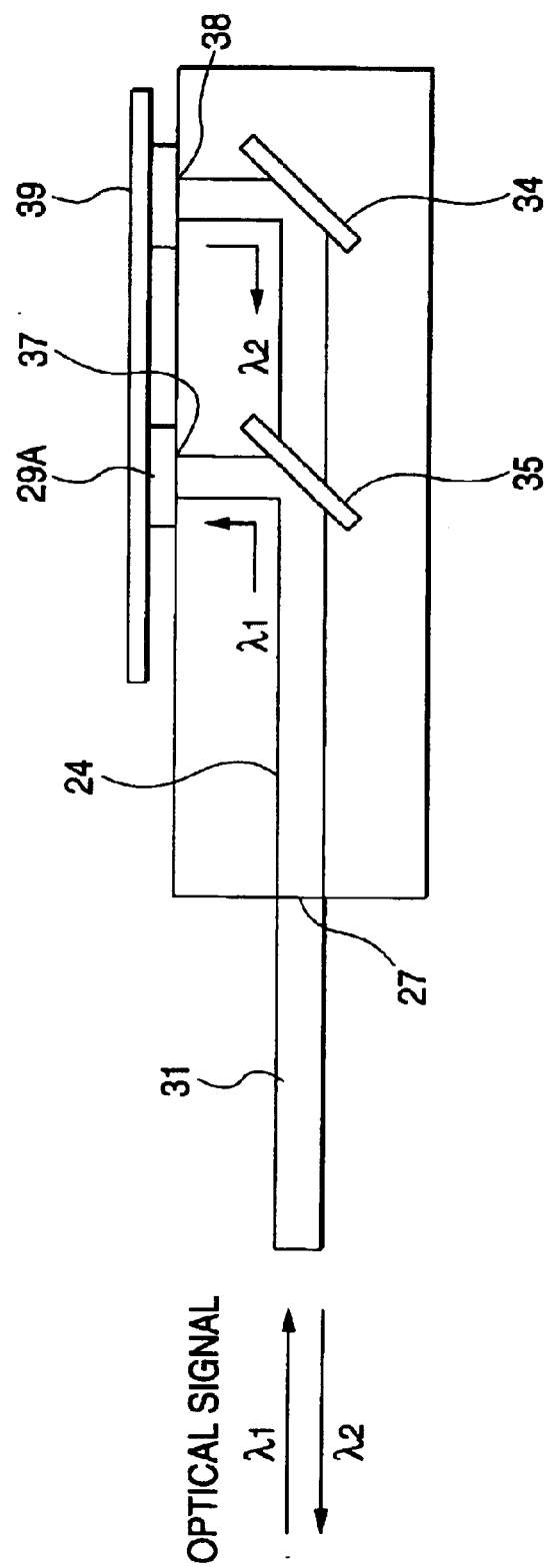
FIG. 8 is a sectional view showing the configuration of the optical waveguide type two-way communication device according to a modification.

Although the first and second embodiments have been described upon the case where an optical frequency multiplexing receiving device (triple-wavelength multiplexing one-way receiving device) is manufactured, application of the invention is not limited to such a receiving device. For example, the invention may be applied also to a (double-wavelength multiplexing single-line) two-way communication device shown in FIG. 8. In this case, a receiving sensor $29_A$ and a light-emitting element 39 as photoelectric conversion elements are mounted on end surfaces 37 and 38 of an optical waveguide 24. An optical signal at a wavelength $\lambda_1$ input from an optical fiber 31 is propagated through the optical waveguide 24 and all input to the receiving sensor $29_A$ through an interference filter (wavelength selective filter) 35. That is, the signal is received. On the other hand, an optical signal at a wavelength $\lambda_2$ emitted from the light-emitting element 39 is reflected toward the end surface 27 side of the optical waveguide 24 through the interference filter 34, so that the reflected light is output to the optical fiber 31. That is, the optical signal is transmitted. That is, a double-wavelength multiplexing communication device which can transmit/receive optical signals by a single line can be formed. Such a device may be used.

Figure 9A:
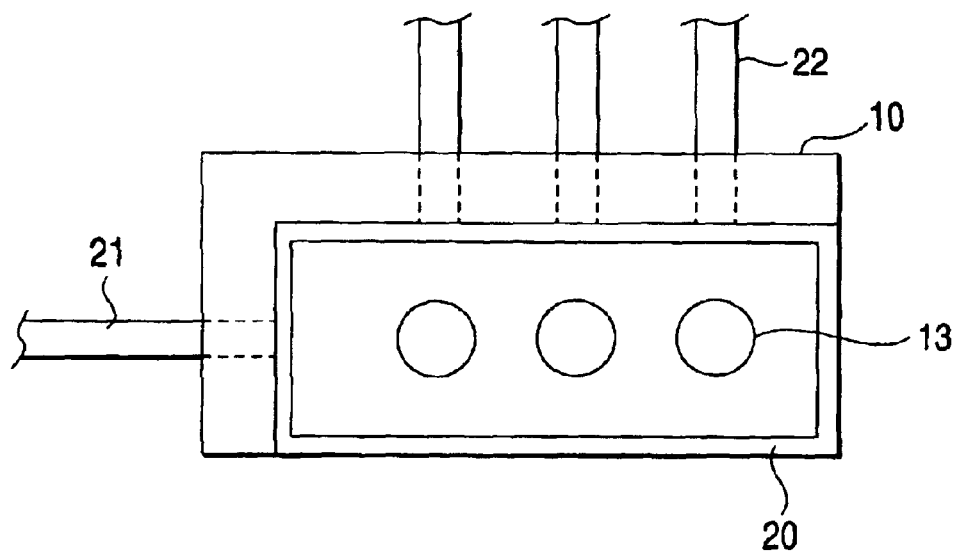
FIGS. 9A and 9B are a top view and a front view showing a jig for manufacturing an optical waveguide device according to a modification.
Figure 9B:
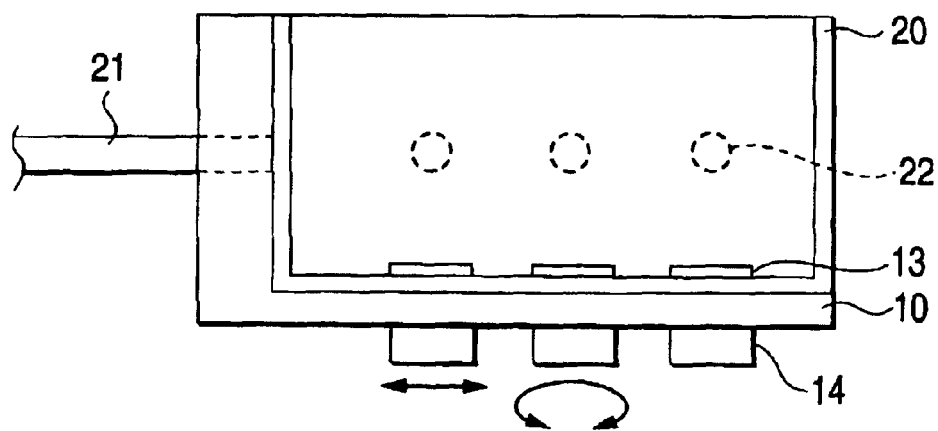

Further, in the first and second embodiments, if there is a variation in thickness of the interference filters 25, this variation may cause displacement of the optical path of transmitted light. Further, if there is an angular error in the installation of the interference filters 25, the path of the reflected light is displaced from the predetermined optical path. In order to cope with such situations, as shown in FIGS. 9A and 9B, an adjusting device for adjusting positions and angles of the optical components such as interference filters may be provided under the optical components. For example, a jig for manufacturing the optical waveguide device is formed such that a side wall of the housing 10 is L-shaped and such that a bottom plate is formed on the side wall of the housing 10. The adjusting device is composed of soft magnetic materials 13, and magnets 14. The soft magnetic materials 13 are provided under the optical components. The magnets 14 are provided so as to be nipped by the transparent container 20 and the bottom plate of the housing 10. The optical components may be erected directly from the soft magnetic materials 13, or supports may be provided on the soft magnetic materials 13 to support the optical components so that the supports serve as axes of rotation for the optical components. Incidentally, FIGS. 9A and 9B are views showing the case the housing 10 of the optical waveguide device manufacturing jig is mounted on the transparent container 20 where no optical component is mounted yet. FIG. 9A is a top view and FIG. 9B is a front view.

While in use, these optical components (such as interference filters 25) are inserted in the container, and a photo-curable resin solution 23 is injected into the container. Then, light at a wavelength (for example, 633 nm) incapable of curing the photo-curable resin solution 23 is guided into the container through an optical fiber 21. When the magnets 14 are moved in parallel to maximize the guided light at each of the optical fibers 22 on the output side, positions where the optical components are located can be changed. When the magnets 14 are rotated, the optical components are rotated to make it possible to adjust the reflection angle of the light. In such a manner, the optical axis can be aligned accurately. That is, an optical waveguide device with higher accuracy can be manufactured. The optical waveguide device thus manufactured may be used.

Although the first embodiment has been described upon the case where the low-refractive-index photo-curable resin solution 26 which is a photo-curable resin solution to be solidified wholly is injected into the transparent container 20 and solidified by ultraviolet light ($\lambda_C$), the invention may be applied also to the case where a heat-curable resin solution is used as the photo-curable resin solution. In this case, heating may be performed instead of irradiation with ultraviolet light. Also in this case, the transmission loss is about 0.5 dB/cm. Further, when the heat-curable resin solution is used, it is unnecessary to use the transparent container 20 made of optical glass or the like. Accordingly, manufacturing can be made inexpensively. Incidentally, when an opaque container such as a metal container is used, optical components such as optical sensors may be provided in the inside of the opaque container or holes may be provided in the opaque container so that optical waveguides can be connected to optical sensors directly. The same effect can be obtained also in this case.

Although the first and second embodiments have been described upon the case where argon ion laser light at a wavelength $\lambda_W$=488 nm is used as the short-wave laser light, the invention may be applied also to the case where He—Cd (helium-cadmium) laser light at a wavelength $\lambda_W$=325 nm is used in accordance with the photo-curable resin solution. The same effect can be obtained also in this case. Further, a superhigh-pressure mercury lamp ($\lambda$=380 nm) or the like may be used if light from the lamp can be made as substantially parallel light rays.

What is claimed is:

1. A method of manufacturing an optical waveguide device comprising:

inserting at least one optical component in a container at a predetermined position;

filling said container with a first photo-curable resin solution;

mounting a jig onto said container;

guiding a first light at a predetermined wavelength into said container through at least one of a plurality of light inlets;

curing said first photo-curable resin solution thereby forming at least one optical waveguide such that said optical component is connected to said at least one of a plurality of light inlets by said optical waveguide; and forming an optical waveguide device having a predetermined number of input-output ends.

2. A method of manufacturing an optical waveguide device according to claim 1, further comprising:

removing an uncured part of said first photo-curable resin solution in surroundings of said at least one optical waveguide from said container after said at least one optical waveguide is formed;

embedding said at least one optical waveguide in a low-refractive-index resin solution having a refractive index lower than that of said at least one optical waveguide; and solidifying said low-refractive-index resin solution.

3. A method of manufacturing an optical waveguide device according to claim 2, wherein said low-refractive-index resin solution comprises at least one of a second photo-curable resin solution and a heat-curable resin solution which is highly mutually soluble in said first photo-curable resin solution with which said at least one optical waveguide is formed.

4. A method of manufacturing an optical waveguide device according to claim 1, wherein said at least one optical component comprises an interference filter.

5. A method of manufacturing an optical waveguide device according to claim 4, wherein said interference filter comprises a semi-transparent mirror which is transparent to wavelengths other than an interference wavelength.

6. A method of manufacturing an optical waveguide device according to claim 1, further comprising:

guiding said first light into said container through another of said plurality of light inlets, wherein said at least one of said plurality of light inlets and said another of said plurality of light inlets are disposed along different paths from the optical component.

7. A method of manufacturing an optical waveguide device according to claim 6, wherein said curing of said first photo-curable resin forms another optical waveguide to said optical component.

8. A method of manufacturing an optical waveguide device according to claim 1, wherein at least opposite two ends of said optical waveguide are fixed to said container.

9. A method of manufacturing an optical waveguide device according to claim 1, wherein at least one of a position and an angle of said at least one optical component is adjustable from an outside of said container; and said at least one of the position and the angle of said at least one optical component is adjusted after said photo-curable resin solution is injected into said container such that a second light input through one of said plurality of light inlets is output through another of said plurality of light inlets while said second light includes a wavelength incapable of curing said photo-curable resin solution.

10. A method of manufacturing an optical waveguide device according to claim 1, wherein said at least one of said plurality of light inlets comprises a hole into which an optical fiber with which said first light at said predetermined wavelength is output is fitted.

11. A method of manufacturing an optical waveguide device according to claim 1, further comprising:

guiding said first light into said container through another of said plurality of light inlets such that said curing of said first photo-curable resin forms another optical waveguide such that said optical component is connected to said at least one of said plurality of light inlets by said at least one optical waveguide and said another of said plurality of light inlets by said another optical waveguide.

12. A method of manufacturing an optical waveguide device according to claim 1, wherein said photo-curable resin solution comprises a mixture solution of a high-refractive-index photo-curable resin solution and a low-refractive-index photo-curable resin solution different in curing initiating wavelength; and a light including a first predetermined wavelength capable of curing only said high-refractive-index photo-curable resin solution is guided into said container through said at least one of said plurality of light inlets to form said at least one optical waveguide, and after a formation of said at least one optical waveguide, a light including a second predetermined wavelength capable of curing both said high-refractive-index photo-curable resin solution and said low-refractive-index photo-curable resin solution is radiated onto a whole uncured part of said mixture solution in surroundings of said at least one optical waveguide to thereby solidify said mixture solution.

13. A method of manufacturing an optical waveguide device according to claim 1, wherein said predetermined wavelength used for said formation of said at least one optical waveguide is different from wavelengths of optical signals with which said optical guide device is operated after said optical waveguide device is formed.

14. An optical waveguide device manufactured by a method according to claim 1, wherein at least one of an optical element and a photoelectric conversion element is coupled with at least one of said predetermined number of input-output ends of said optical waveguide device.

15. A method of manufacturing an optical waveguide device according to claim 1, wherein said at least one optical component comprises a plurality of interference filters, and wherein said plurality of optical interference filters are disposed along a path of said at least one of said plurality of light inlets.

16. A method of manufacturing an optical waveguide device according to claim 1, further comprising:

guiding said first light into said container through another of said plurality of light inlets such that said curing of said first photo-curable resin forms another optical waveguide such that said optical component is connected to said another of said plurality of light inlets by said another optical waveguide.

17. A method of manufacturing an optical waveguide device comprising:

inserting at least one optical component in a container at a predetermined position;

filling said container with a first photo-curable resin solution;

guiding a first light at a predetermined wavelength into said container through a plurality of light inlets; and curing said first photo-curable resin solution thereby forming a plurality of optical waveguides such that said at least one optical component is connected to said plurality of light inlets by said plurality of optical waveguides.

18. A method of manufacturing an optical waveguide device according to claim 17, further comprising:

adjusting at least one of a position and an angle of said at least one optical component after said photo-curable resin solution is filled into said container such that a second light input through a first light inlet of said plurality of light inlets is output through a second light inlet of said plurality of light inlets.

19. A method of manufacturing an optical waveguide device according to claim 18, wherein said second light includes a wavelength incapable of curing said photo-curable resin solution.

20. A method of manufacturing an optical waveguide device according to claim 18, wherein at least one of said position and said angle of said at least one optical component is adjustable from an outside of said container.

21. A method of manufacturing an optical waveguide device according to claim 17, wherein each of the plurality of light inlets comprises a hole, and wherein an optical fiber that outputs said first light is fitted into said each of the plurality of light inlets.

22. A method of manufacturing an optical waveguide device according to claim 17, wherein at least two of said plurality of optical waveguides are disposed along different paths of said at least one optical component.

23. A method of manufacturing an optical waveguide device according to claim 17, wherein one of said plurality of optical waveguides is disposed along a first path of said at least one optical component and another of said plurality of optical waveguides is disposed along a second path of said at least one optical component.

24. A method of manufacturing an optical waveguide device according to claim 17, wherein one of said plurality of optical waveguides is disposed along one path of said at least one optical component and another of said plurality of optical waveguides is disposed along another path of said at least one optical component.

25. A method of manufacturing an optical waveguide device comprising:

inserting at least one optical component in a container at a predetermined position;

filling said container with a first photo-curable resin solution;

guiding a first light at a predetermined wavelength into said container through a plurality of light inlets, wherein at least one of said plurality of inlets is disposed along one path of said at least one optical component and another of said plurality of inlets is disposed along another path of said at least one optical component; and curing said first photo-curable resin solution thereby forming a plurality of optical waveguides such that said at least one optical component is connected to said plurality of light inlets by said plurality of optical waveguides.

* * * * *